INVENTOR.
JAMES MILLARD EVERSON

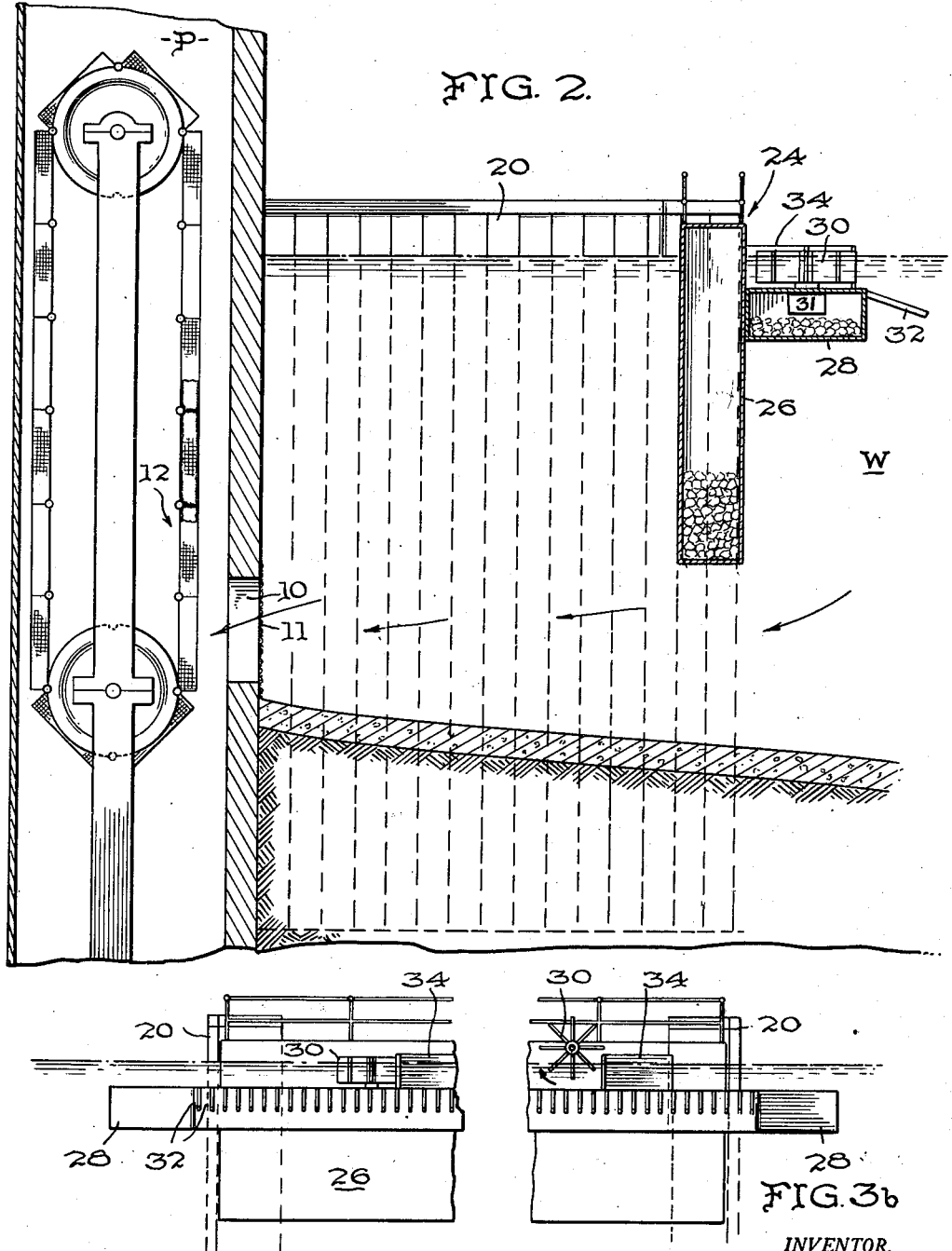

United States Patent Office 2,837,211
Patented June 3, 1958

2,837,211

DEBRIS REMOVER FOR POWER PLANT INTAKES

James Millard Everson, Brilliant, Ohio

Application February 2, 1955, Serial No. 485,728

9 Claims. (Cl. 210—154)

This invention relates to hydraulic power plants and more particularly to a debris remover which effectively prevents the entry of floating debris into the intake of a power plant and efficiently disposes of such floating debris.

A problem encountered in hydraulic power plants is the prevention of the entry of debris into the intake of the power plant. In the past, many means for preventing the ingress of debris to the power plant have been devised. However, most of such devices of which I am aware fail to make adequate provision for the disposal of the debris which is prevented from entering the intake mouth. As a result, large amounts of debris collect about the intake mouth of the power plant and periodically it is necessary to remove this debris. The removal of debris which has collected in this manner is not only time consuming and expensive, but often necessitates the shutting down of the power plant while the debris is actually being removed.

It is a primary object of my invention to provide a structure which not only prevents floating debris from entering the intake mouth of a power plant, but also prevents the accumulation of debris in this area.

Another object of my invention is to provide a means by which floating debris which would ordinarily collect around the intake mouth of a power plant is directed into the path of water discharged from the discharge mouth of the plant whereby the debris is efficiently disposed of.

In the attainment of the above and other objects, my invention contemplates the provision of a confined channel which extends outwardly from the intake mouth of the power plant into the body of water from which the motive power for the plant is derived. A series of floating tanks are disposed across the outer end of the channel to form a floating barrier which extends beneath the surface of the water to a depth substantially equal to that of the intake mouth. Extending outwardly from this floating barrier, beneath the surface of the water, is a shelf. A plurality of paddle wheels are rotatably mounted either directly upon or above the shelf and are driven to create a current in the body of water which will carry floating debris into the path of water expelled from the discharge mouth of the power plant. A series of baffle plates are provided to prevent floating debris from directly engaging the paddle wheels. On the outboard side of the shelf, a series of fingers extend outwardly and downwardly to catch the lighter pieces of debris which might be drawn downwardly toward the intake mouth in this area.

The above structure is not intended to replace the conventional screening arrangements which are presently provided within the intake mouth of such power plants but is intended to be used in addition to such screening devices. The debris remover described above effectively prevents the accumulation of floating debris around the intake mouth of the power plant and disposes of the floating debris continuously by directing the floating debris downstream into the path of the discharge mouth of the power plant, at which point a strong current is available to carry the debris away from the power plant itself. My arrangement effectively prevents the major portion of floating debris from reaching the screening device, thus permitting a much more efficient operation of the screen.

Other objects and advantages of my invention will become readily apparent with reference to the following specification taken in connection with the drawings.

In the drawings,

Fig. 2 is a cross-sectional view of the embodiment shown in Fig. 1 taken on the line 2—2 of Fig. 1;

Fig. 3a is a side elevation of the structure shown in Fig. 1;

Fig. 3b is a side elevation of a second embodiment of the structure shown in Fig. 1.

Figure 1:
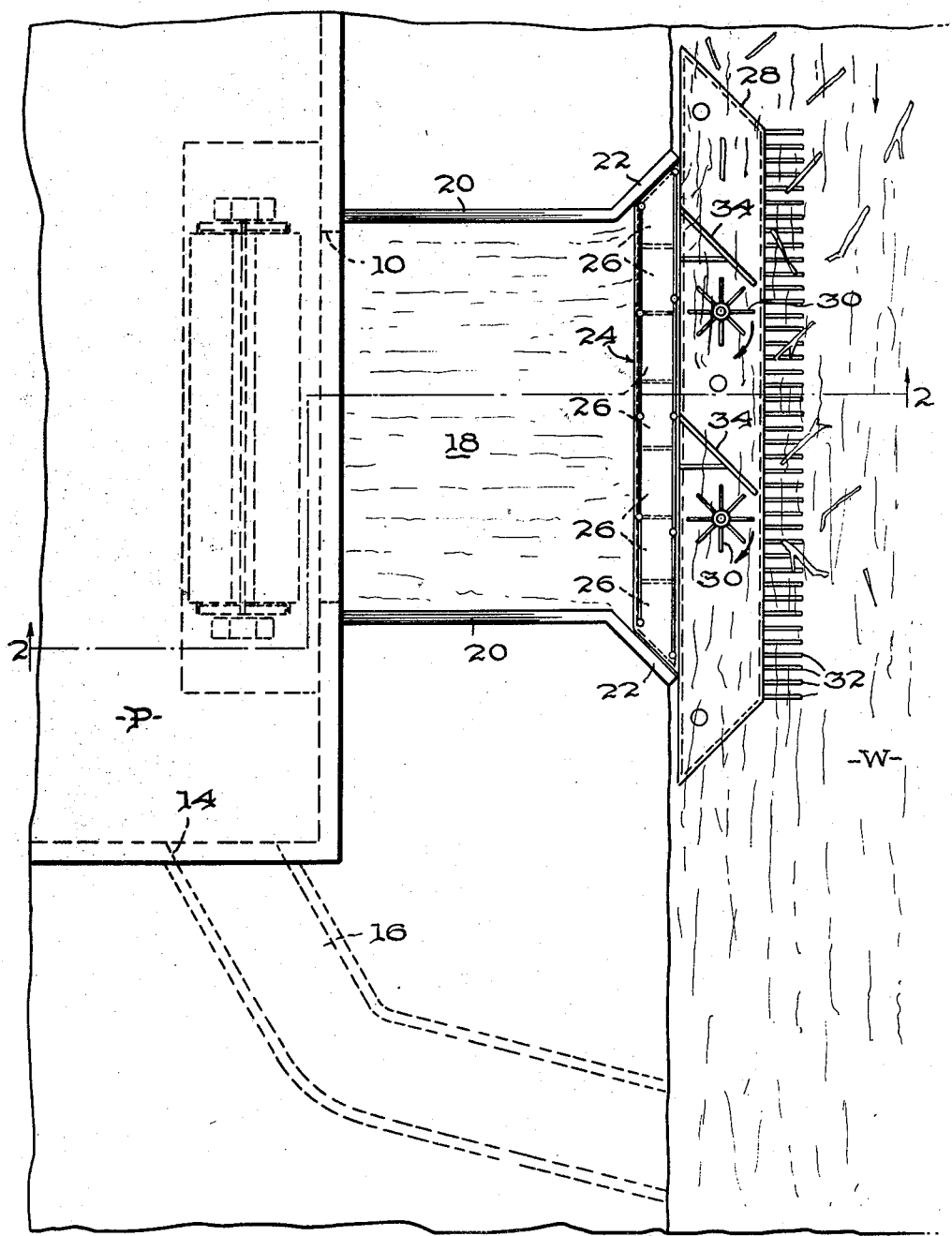
Fig. 1 is a plan view of one embodiment of my invention.

As shown in Fig. 1, my device is shown in conjunction with a power plant P located at the side of a body of water W. The power plant P is provided with an intake mouth 10, through which water from the body of water W enters into the interior of the power plant P. A wire mesh 11 is disposed across the opening of intake mouth 10 and immediately inside intake mouth 10 is located a screening device 12, which is illustrated in a more-or-less schematic manner. Screening device 12 is adapted to collect debris which passes through mesh 11 and to dispose of the debris in the suitable manner within the confines of the power plant P. After energy has been extracted from the water within the power plant, the water is discharged through discharge mouth 14 and is returned through a suitable channel 16, into the body of water from which it is withdrawn.

The structure described thus far is more or less conventional in power plant installations. Many types of screening devices have been devised for use in the manner of screening device 12, shown in my drawings, and such devices provide a more or less effective method of shielding the operating machinery within the plant from debris which is sucked into the intake mouth. However, as has been stated above, the debris which is extracted by the screening means 12 must be disposed of in some manner since such debris is constantly collected by the screening means.

Further, debris which cannot pass through the wire mesh 11 is held against the mesh by the force of the current entering intake mouth 10. Debris continually collects in this manner and soon clogs the intake mouth 10 sufficiently to require its removal. My invention is concerned with the prevention of the collection of debris by wire mesh 11, as well as with greatly reducing the amount of debris which must be handled by the screening device 12. These desirable results are accomplished in the following manner.

A confined channel 18 is defined by a pair of walls 20 which extend outwardly from the power plant on either side of the intake mouth 10 into the body of water W. At their outer ends, these walls may be flared as at 22 to firmly locate a floating barrier indicated generally by the numeral 24.

Floating barrier 24 is composed of a series of tanks 26, which may be ballasted to cause them to float at any desired depth. As best seen in Fig. 2, the floating tanks 26 extend for some distance beneath the surface of the body of water W to a depth substantially equal to the depth of intake mouth 10. Secured to the outboard side of the floating tanks 26 in any suitable manner, and forming a part of the floating barrier, is an elongated shelf 28, which projects outwardly from tanks 26 beneath the surface of the water. In the embodiment shown in the Figs. 1, 2 and 3a, a plurality of paddle wheels 30 are mounted on the upper surface of shelf 28 for rotation about vertical axes. Paddle wheels 30 are driven by any suitable means, indicated schematically at 31 in Fig. 2, to rotate in a clockwise direction as viewed in Fig. 1, to create a current at their outersides toward discharge channel 16. This current carries floating debris which comes adjacent to the paddle wheels toward the outlet of discharge channel 16 where the current, created by the water expelled from discharge channel 16, drives the debris away from the power plant and prevents it from accumulating adjacent the intake opening. Since the downward component of the current created by the water which enters intake mouth 10 is substantial, I prefer to space the floating barrier 24 at some distance outward of the intake mouth 10. In order to effect a compromise between the expense of constructing channel walls 20 and the relative degree of efficiency of disposing of floating debris, a series of fingers 32 are mounted along the outer edge of shelf 28 and extend outwardly and downwardly therefrom. The fingers 32 extend across the entire outboard edge of the shelf 28 and prevent the lighter elements of floating debris from being sucked downwardly beneath the shelf 28 and thus into intake mouth 10.

By spacing the floating barrier 24 a sufficient distance outward of intake mouth 10, and by the provision of fingers 32, only that debris which is light enough to be affected by the slight downward current in the region outward of fingers 32 can avoid fingers 32 and the current created by the paddle wheels 30 to reach wire mesh 11. Obviously, only the smaller and lighter elements of debris will be effected in this manner and the great majority of them will be of such a size as to be able to pass through wire mesh 11. Thus, the collection of debris by wire mesh 10 is either entirely or substantially eliminated.

To prevent heavier debris from damaging the paddle wheels 30, I provide baffle plates 34 on the upstream side of paddle wheels 30. Baffle plates 34 are mounted on the upper surface of shelf 28 and extend upwardly therefrom above the water surface. Baffle plates 34 not only prevent floating debris from directly engaging the rotating paddle wheels, 30, but also minimize the upstream current which would be created by the inner portion of the paddle wheels during their clockwise rotation as viewed in Fig. 1.

In another embodiment of my invention, the creation of any upstream current by the rotating paddle wheels may be eliminated by mounting the paddle wheels for rotation about horizontal axes as shown in Fig. 3b. The remaining structure employed in the embodiment of Fig. 3b is similar to that used in the embodiment previously described and differs therefrom only in the mounting of the paddle wheels for rotation about a horizontal rather than a vertical axis.

From the foregoing it will be seen that the major portion of floating debris is prevented from entering the intake mouth of the power plant and is carried away from and prevented from accumulating adjacent to the power plant. Any lighter or smaller units of debris which are not disposed of in this manner are prevented from entering the operating machinery of the power plant by the screening means 12 in a more or less conventional manner.

While I have illustrated but one embodiment of my invention, it will be apparent to those skilled in the art that my basic concept is capable of modification. The foregoing disclosure has been directed specifically to a power plant installation. However, it should be understood that I do not consider this to be the only environment in which my invention is useful. Therefore, the foregoing description is to be considered exemplary rather than limiting and the true scope of my invention is that defined in the following claims.

I claim:

1. A debris remover useful in combination with a hydraulic power plant having an intake mouth and a discharge mouth comprising: a wall extending outwardly from each side of said intake mouth to define a channel from said intake mouth into a body of water, a floating barrier extending between the outer ends of said walls, paddle wheels rotatably mounted on the outer side of said barrier, and means for driving said paddle wheels to create a current in said body of water to direct floating debris away from said floating barrier and into the path of water expelled from said discharge mouth.

2. A debris remover useful in combination with a hydraulic power plant having an intake mouth and a discharge mouth comprising: walls extending from each side of said intake mouth outwardly to define a channel from said intake mouth into a body of water, a floating barrier extending between the outer ends of said walls, a shelf located on the outward side of said barrier beneath the surface of said body of water, paddle wheels rotatably mounted above said shelf, and means for driving said paddle wheels to create a current in said body of water to direct floating debris away from said floating barrier into the path of water discharged from said discharge mouth.

3. In a hydraulic installation having an intake mouth and a discharge mouth; walls extending outwardly from each side of said intake mouth to define a channel from said intake mouth to a body of water, a floating barrier secured to and extending between the outer ends of said walls, a shelf located on said floating barrier and extending outwardly therefrom beneath the surface of said body of water, a plurality of fingers extending outwardly from said shelf, a plurality of paddle wheels mounted for rotation above said shelf, baffle means secured to said barrier to shield said paddle wheels from floating debris, and means for driving said paddle wheels to create a current in said body of water to direct floating debris away from said barrier and into the path of water expelled from said discharge mouth.

4. In a hydraulic installation having an intake mouth and a discharge mouth, screen means located within said power plant adjacent said intake mouth, a channel extending from said intake mouth to a body of water, a floating barrier extending across said channel, a shelf secured to the outward side of said floating barrier beneath the surface of said body of water, and means supported above said shelf for creating a current in said body of water to direct floating debris away from said floating barrier and into the path of water discharged from said discharge mouth.

5. For use in combination with an hydraulic power plant having an intake mouth and a discharge mouth; a channel extending from said intake mouth into a body of water, a barrier secured across the outer end of said channel and extending beneath the water surface to a depth substantially equal to the depth of said intake mouth, a channel extending from said discharge mouth into said body of water, and means connected with said barrier for creating a current in said body of water to direct floating debris away from said barrier into the path of water discharged from said last mentioned channel.

6. For use in combination with an hydraulic power plant having an intake mouth and a discharge mouth; a first channel extending from said intake mouth into a body of water, a barrier secured across the outer end of said first channel and extending beneath the water surface to a depth substantially equal to the depth of said intake mouth, a second channel extending from said discharge mouth into said body of water, and a plurality of paddle wheels rotatably mounted on the outer side of said barrier at the water surface for creating a current to direct floating debris away from said barrier and into the path of water discharged from second channel.

7. For use in combination with an hydraulic power plant having an intake mouth and a discharge mouth; a channel extending from said intake mouth into a body of water, a barrier secured across the outer end of said channel and extending beneath the surface of said body of water to a depth substantially equal to the depth of said intake mouth, a shelf secured to said barrier and extending outwardly therefrom, paddle wheels mounted for rotation above said shelf, and means for driving said paddle wheels to create a current in said body of water to direct floating debris away from said barrier into the path of water expelled from said discharge mouth.

8. For use in combination with an hydraulic power plant having an intake mouth and a discharge mouth, a screening device located within said plant adjacent said intake mouth to extract debris which enters said intake mouth, a wire mesh secured across said intake mouth, a channel extending from said intake mouth into a body of water, a barrier secured across the outer end of said channel and extending beneath the water surface to a depth substantially equal to a depth of said intake mouth and above the bottom of said channel, and means located adjacent the outer side of said barrier to create a current in the water for directing debris away from said barrier and preventing the accumulation of floating debris adjacent said barrier and said wire mesh.

9. The combination recited in claim 8 wherein said means comprise a plurality of paddle wheels supported for rotation in the water above a shelf extending outwardly from the barrier, and a plurality of fingers extending outwardly from said shelf, said barrier, paddle wheels and fingers being so located with respect to said intake mouth as to dispose of substantially all floating debris which would otherwise be collected upon said wire mesh.

References Cited in the file of this patent

UNITED STATES PATENTS 1,213,624    Glenn  ------------------ Jan. 23, 1917